Patented Jan. 8, 1929.

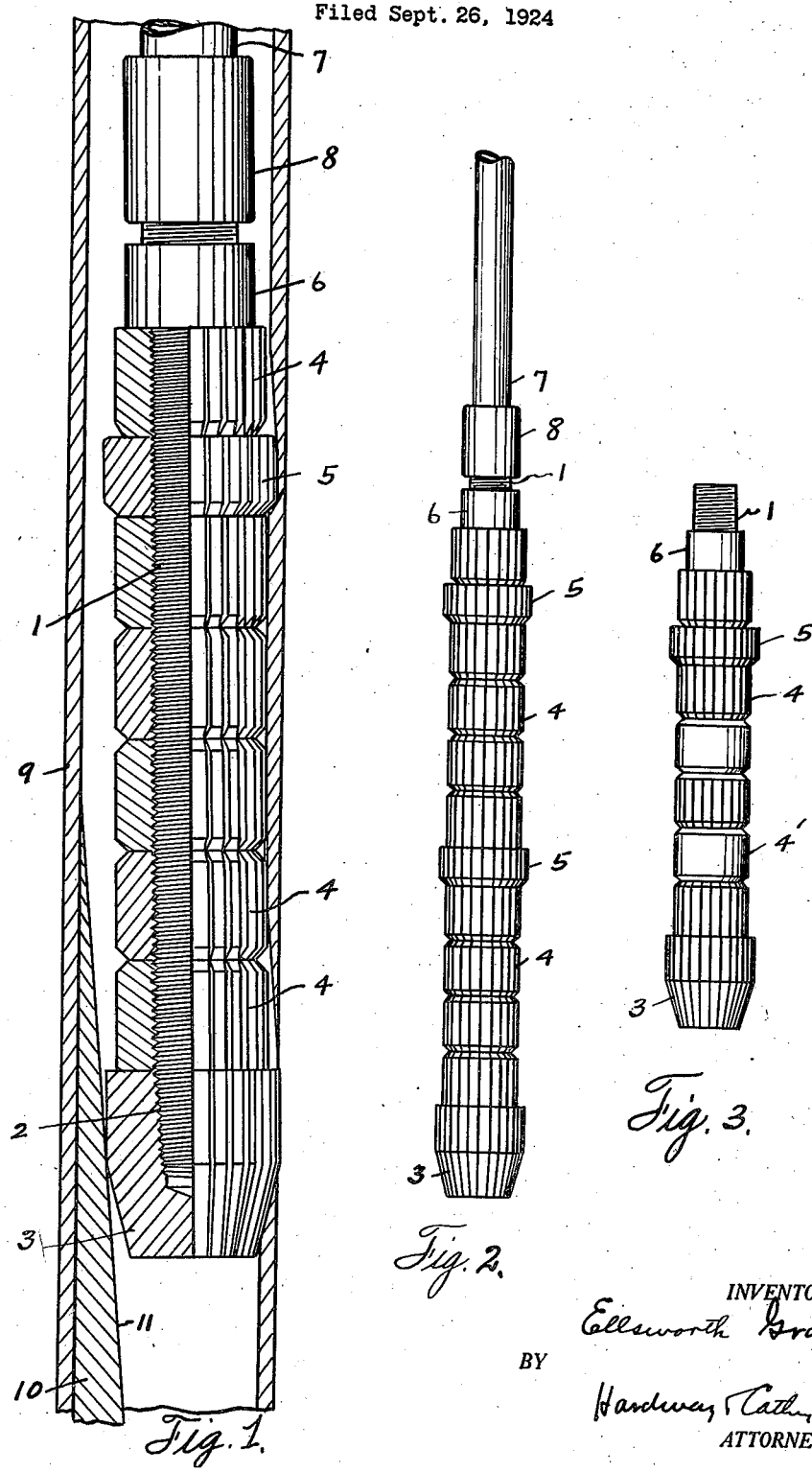

1,698,496

UNITED STATES PATENT OFFICE.

ELLSWORTH GRAY, OF HOUSTON, TEXAS, ASSIGNOR TO GRAY TOOL COMPANY, OF HOUSTON, TEXAS, A CORPORATION.

MILLING TOOL.

Application filed September 26, 1924. Serial No. 740,004.

This invention relates to new and useful improvements in a milling tool.

One object of the invention is to provide a tool of the character described specially constructed and adapted for use in perforating a casing set in a well bore; the tool is particularly useful for the purpose of forming a lateral perforation in a casing in a well bore through which the drill bit and stem may pass when it is desired to "side track" the original bore.

In drilling wells a casing is usually set as drilling progresses and it often happens that some obstruction occurs to prevent the further deepening of the original bore, as for example by accidentally dropping an obstruction, such as the drilling tools into said bore. In such case it is often desirable to form a lateral perforation through the casing, above said obstruction, through which the drilling tool, and stem, may pass thereby permitting the continuation of the bore until the desired depth is attained. This operation is commonly known as "side tracking," and it is through the use of a milling tool that this work, of perforating the casing, is carried out.

Another object of the invention is to provide a device of the character described which is novelly constructed in such a manner that the work of properly perforating the casing may be much more quickly accomplished than with the use of instrumentalities now commonly used for that purpose.

With the above and other objects in view this invention has particular relation to certain novel features of construction, operation and arrangement of parts, an example of which is given in this specification and illustrated in the accompanying drawings, wherein:—

Figure 1 shows an enlarged view of the milling tool, shown partly in section in the casing.

Figure 2 shows a side elevation of another form of the tool, and

Figure 3 shows still another modification thereof.

Referring now more particularly to the drawings, wherein like numerals of reference designate similar parts in each of the figures, the numeral 1 designates an externally threaded arbor whose lower end 2 is slightly tapered, and threaded on the tapered end there is an internally toothed pilot cutter 3. The outer end of this cutter is, preferably, also tapered, as shown.

Threaded onto the arbor, in abutting relation are the sleeve like milling cutters 4, and 5, the lower one of which abuts against the pilot cutter 3; it should be observed, however, that in the form shown in Figure 3 they are alternatively arranged with respect to blank sleeves, as 4'. In some cases these blank sleeves may be used, without reducing the efficiency of the tool, and thus conducing to cheapness of construction. The cutters 3 and 5 are of somewhat greater diameter than the cutters and blank sleeves 4 and 4'.

A clamp nut 6 is threaded onto the arbor and clamps the cutters in place, and the tool, thus assembled is connected to a driving stem 7, by means of the usual coupling 8.

The numeral 9 designates the casing to be perforated. In operation a conventional whip stock 10 is located in the casing in the well known manner, just beneath the point where the casing is to be perforated. The upper end of this whip stock has a beveled face 11, as shown. The milling tool is then let down into the casing and its lower end will wedge between the upper end of the whip stock 10 and the opposite side of the casing. As the tool is rotated the cutter 3 will bite into the casing, and soon thereafter the cutter 5 will also come into contact with and begin to cut away the casing opposite it until the casing is perforated by both of said cutters. Meanwhile the intermediate milling cutters 4 cut away the casing as they come into contact with it as the tool moves downwardly and outwardly through the casing. If only one of the large cutters 5 is employed, it, together with the pilot cutter 3, will double the amount of work which can be performed by the pilot cutter alone, that is as the milling tool moves downwardly the length of the hole cut through the casing will be approximately double the distance the tool moves. If a greater number of cutters 5 are employed, as for example the number indicated by Figure 2, the amount of hole cut will be proportionately increased.

The sections 3, 4, 4' and 5 may be formed integrally together but it will be more practical, from a standpoint of manufacture and repairs to form them separately, and they may be keyed, or otherwise secured on the arbor.

By the use of this tool a clean hole can easily be cut through the casing of such shape and dimensions that the drill bit and stem will readily pass through it in "side tracking."

What I claim is:

1. A milling tool including an outwardly threaded arbor one end of which is tapered, an internally threaded pilot cutter threaded onto said tapered end, the free end of said cutter being tapered, a plurality of sleeve like milling cutters threaded onto the arbor in abutting relation and one of which abuts the pilot cutter, a clamp collar threaded onto the other end of the arbor and abutting the adjacent cutter.

2. A milling tool including an outwardly threaded arbor one end of which is tapered, an internally threaded pilot cutter threaded onto said tapered end, the free end of said cutter being tapered, a plurality of sleeve like milling cutters threaded onto the arbor in abutting relation and one of which abuts the pilot cutter, a clamp collar threaded onto the other end of the arbor and abutting the adjacent cutter, some of said milling cutters being of greater transverse diameter than the other milling cutters.

3. A milling tool including an outwardly threaded arbor one end of which is tapered, an internally threaded pilot cutter threaded onto said tapered end, the free end of said cutter being tapered, a plurality of sleeve like milling cutters threaded onto the arbor in abutting relation and one of which abuts the pilot cutter, a clamp collar threaded onto the other end of the arbor and abutting the adjacent cutter, the adjacent ends of said cutters being beveled.

4. A milling tool including an outwardly threaded arbor one end of which is tapered, an internally threaded pilot cutter threaded onto said tapered end, the free end of said cutter being tapered, a plurality of sleeve like milling cutters threaded onto the arbor in abutting relation and one of which abuts the pilot cutter, a clamp collar threaded onto the other end of the arbor and abutting the adjacent cutter, and blank sleeves threaded onto the arbor and spacing some of the milling cutters apart.

5. A milling tool comprising an elongated arbor which is externally threaded, a pilot milling cutter threaded onto one end thereof, a plurality of sleeve like cutters of less diameter than the milling cutter threaded onto the arbor in abutting relation and one of which abuts the pilot cutter and a clamp collar threaded on to the other end of the arbor and abutting the adjacent milling cutter.

6. A milling tool comprising an elongated arbor which is externally threaded, a pilot milling cutter threaded onto one end thereof, a plurality of sleeve like cutters, threaded onto the arbor in abutting relation and one of which abuts the pilot cutter and means on the end of the arbor remote from the pilot cutter, and abutting the adjacent milling cutter and effective to maintain said sleeve like cutters in assembled relation with the arbor.

In testimony whereof I have signed my name to this specification.

ELLSWORTH GRAY.